United States Patent [19]

Jolin

[11] 4,109,347

[45] Aug. 29, 1978

[54] POWER OPERATED APPARATUS FOR SPLITTING CARCASSES OF SLAUGHTERED ANIMALS

[75] Inventor: Andre Jolin, Guebwiller, France

[73] Assignee: Micarna AG Fleischwarenfabrik, Bazenheid, Switzerland

[21] Appl. No.: 755,543

[22] Filed: Dec. 30, 1976

[30] Foreign Application Priority Data

Jan. 8, 1976 [FR] France .................................. 140/76

[51] Int. Cl.² .............................................. A22B 5/20
[52] U.S. Cl. ....................................................... 17/23
[58] Field of Search ................ 17/23, 52; 30/308, 309

[56] References Cited

U.S. PATENT DOCUMENTS

| | | | |
|---|---|---|---|
| 637,490 | 11/1899 | Tower et al. | 17/23 |
| 1,194,838 | 8/1916 | Hachmann | 30/308 |
| 1,309,278 | 7/1919 | Earle | 30/309 |
| 1,699,695 | 1/1929 | Feister | 17/23 |
| 3,829,932 | 8/1974 | Griss | 17/23 |

Primary Examiner—Robert Peshock
Assistant Examiner—Paul J. Hirsch
Attorney, Agent, or Firm—Flynn & Frishauf

[57] ABSTRACT

To guide a power operated knife, cleaver, or saw, or the like precisely along the spinal column of the carcass of a slaughtered animal, so that the carcass will be exactly halved lengthwise, a guide pin for the power cutters is inserted into the central opening of the spinal column to guide the cutting apparatus. In accordance with the present invention, the guide pin is movable over a restricted arc to permit following curved portions of the spinal column without binding.

7 Claims, 3 Drawing Figures

POWER OPERATED APPARATUS FOR SPLITTING CARCASSES OF SLAUGHTERED ANIMALS

Cross reference to pertinent prior patent: U.S. Pat. No. 3,829,932, Griss, assigned to the assignee of the present invention.

The present invention relates to butchering of animals, and more particularly to splitting of carcasses of slaughtered animals with a power-driven knife, cleaver, or saw, and means to produce a vertical relative movement between the carcass and the cleaver or saw, and more especially to an apparatus as disclosed and claimed in the cross referenced U.S. Pat. No. 3,829,932, Griss.

The aforementioned Griss patent discloses apparatus effecting relative vertical movement between a suspended carcass and a cutting apparatus, typically a power-operated cleaver or a saw, in brief, the cutter. In order to guide the cutter, a guide pin is introduced into the central opening of the spinal column of the carcass, the guide pin being secured to guide vanes, for example, in form of a sheet metal guide. The sheet metal guides support, or in turn guide the cutter which is power-operated. A movable manually-operated guide structure is connected to the sheet metal members or vanes to permit initial introduction of the guide pin into the center opening of the spinal column.

It has been found that difficulties arise in guiding the cutter when the guide pin enters portions of a spinal column which are curved, since the guide pin may bind. It is an object of the present invention to improve the apparatus of the aforementioned cross-referenced patent so that it is universally applicable, and can be used without binding.

SUBJECT MATTER OF THE PRESENT INVENTION

Briefly, the guide pin is movably supported on the vanes or sheet metal guides, preferably by a pivot connection which permits pivoting of a guide pin over a limited range of pivoting movement about an axis essentially transverse to the major direction of the spinal column of the suspended carcass.

Permitting the guide pin to pivot eliminates the possibility of pinching, jamming, or otherwise interfering with free movement of the guide pin in the region of the neck and head of the carcass; the separating or splitting movement of the cutter can thus extend up to the head, or even to complete splitting of the entire slaughtered carcass.

The invention will be described by way of example with reference to the acompanying drawings, wherein.

Figure 1:
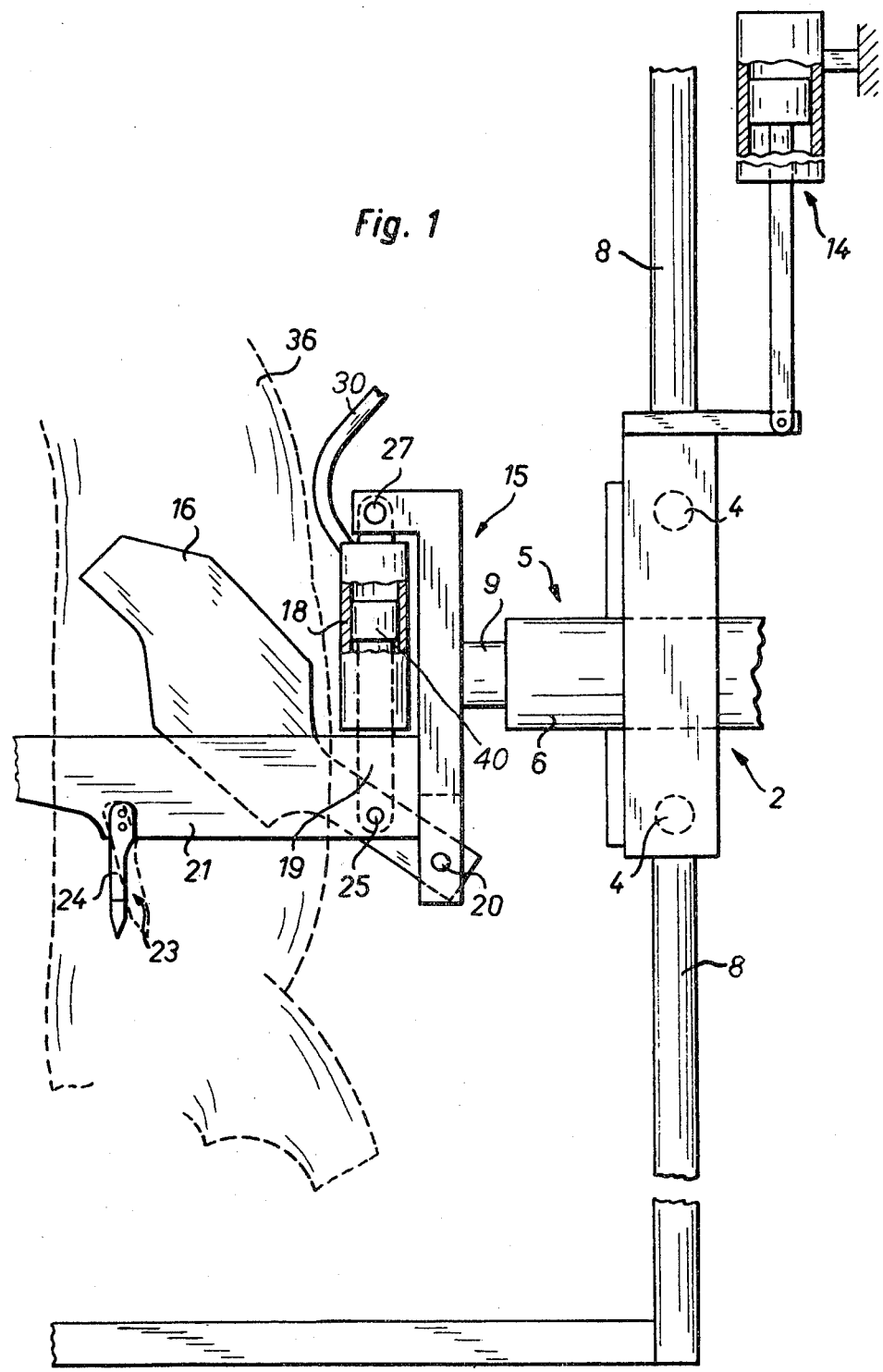
FIG. 1 is a highly schematic side view of the animal carcass splitting apparatus and illustrating those portions necessary for an understanding of the present invention, other portions having been omitted.

For a complete understanding, reference is made to the above-identified cross-referenced patent, the disclosure and drawings of which are herein incorporated by reference. The apparatus is used for longitudinal severance of slaughtered animals, for example pigs or calves along the center of the spinal column. The slaughtered animals are suspended with their hind legs on a suitable hook, head downwardly, with the belly opening, already slit open, facing the apparatus.

The apparatus has two laterally spaced vertical bars 8, connected by a base plate. A sliding carriage 2 is movable up and down on the vertical column 8. Carriage 2 has two cross rods 4 which permit movement of a slidable frame 5 in horizontal direction. The slidable frame 5 has a central guide bushing 6 which supports a horizontal shaft 9. Shaft 9 is axially slidable as well as rotatable is bushing 6. Shaft 9 extends through the bushing and is connected to a handle, not shown in the drawings, and identified as handle 10 in FIGS. 3 and 6 of the aforementioned cross-referenced patent. Handle 10 permits movement of shaft 9 in rotatable direction, as well as axial sliding movement. Carriage 2, together with the element supported thereon can be moved up and down over the entire length of the carcass 36 by means of a vertical positioning device 14.

The end of the shaft 9 facing the animal carcass supports a carrier 15. Carrier 15 supports the cutter, shown as a cleaver 16. The carrier 15 additionally supports a cylinder 18 in which a piston is moved up and down by compressed air. The piston rod 19 is connected by means of pin 25 to the cleaver 16. Cleaver 16 is journalled about board 20. Upon application of compressed air into the cylinder, cleaver 16 will carry out a chopping movement to sever the spinal column of the carcass in the center thereof. Cleaver 16 itself operates between a pair of vanes, or sheet metal guides 21, which spread the meat in the neighborhood of the cut, in order to facilitate the cutting operation.

A guide pin 23 is secured to the vanes, or sheet metal guides 21. Guide pin 23 is located between the spaced vanes 21. Its function is to penetrate the hollow spinal column of the animal carcass in order to guide the cleaver 16 precisely along the length of the spinal column, so that it will be accurately split along the middle thereof. The guide pin 23 is formed with a longitudinal slot 24 to permit penetration of the cleaver 16 therein when the cleaver is in its lowered, striking position.

Figure 2:
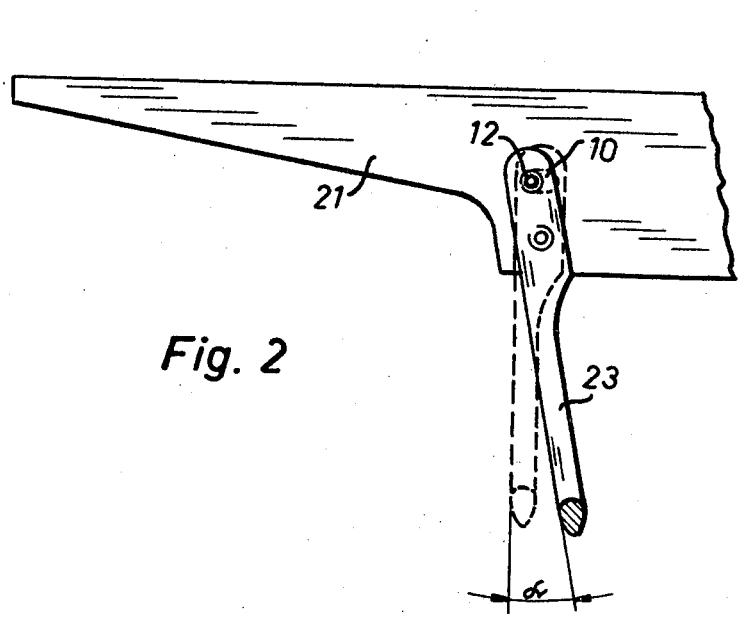
FIG. 2 is a partial side view of the guide bolt and the attachment vane to which it is secured.
Figure 3:
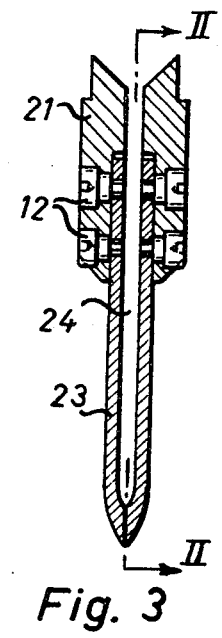
FIG. 3 is a fragmentary cross-sectional view through the guide bolt and the guide vanes.

As best seen in FIGS. 2 and 3, guide pin 23 is pivotally secured to the vanes, or sheet metal guides 21. It can pivot about an angle α which usually would be less than 15°, preferably in the order of about 10°. Movement of the guide pin 23 through this restricted arc is limited by a groove 10 formed in the vanes 21. Guide pin 23 is secured in the vanes by screws 12 which penetrate from both vanes 21 horizontally into the guide pin 23 and are formed with shoulders, or projections engaging the guide pin 23. The screws terminate flush with slot 24 so that slot 24 will be clear for operation therein of the cleaver 16. The lowermost one of the screws 12 forms a journal, or pivot, for rotation of the guide pin 23; the upper one of the screws 12 forms a limit setting guide for the pin 23, and follows the pivoting movement of the guide pin 23. In one terminal position, shown in FIG. 2 in broken lines, the guide pin 23 can extend practically vertically, that is, essentially parallel to the vertical support column 8, and thus essentially parallel to the up and down sliding movement of the apparatus.

The operation of the apparatus is identical to that described in the cross-referenced patent; the pivoting connection effected by bolts 12 permits limited excursion of the bolt 12, thus providing for positive guidance of the vanes 21 for the cutter, while still permitting some freedom of movement so that the guide pin 23 can follow curvatures of the spine of the carcass to be severed.

The various modifications described in the cross-referenced patent are equally applicable with the present invention; thus, for example, different types of cutter apparatus can be used, and multiple cutters, for example, a triple knife with an outer spacing between blades of about 20 to 25 mm can be utilized, to thereby cut the spinal column from the ribs. In such a case, the guiding pin 23 will be used as explained. If double knives are used, one on each side of the guiding pin, the guiding pin 23 may be solid.

I claim:

1. Apparatus for splitting carcasses of slaughtered animals comprising:
    a guiding frame (8) adapted to be located adjacent a suspended carcass to be split;
    a carrier (15) supported on said frame (8) and movably mounted thereon for movement including movement in at least a non-vertical direction;
    cutting means (16) supported on said carrier and movably mounted thereon;
    power-actuated means (18,19,40) for said cutting means (16) supported on said carrier (15),
    hand-operable means (9) for manipulating the position of said carrier (15) and thereby said cutting means; and
    a downwardly projecting pointed guide pin (23) for said cutting means suitable for introduction into the central opening of the spinal column of the carcass to permit guiding the carrier, and hence said cutting means and said guide pin into, and in alignment with the central opening of the spinal column of the said carcass,
    a pair of spaced, essentially parallel vanes (21) projecting from said carrier and secured thereto, each vane being formed with a downwardly directed groove (10) in the surface facing the other vane;
    and pivot means (12) pivotably mounted in the grooves of the vanes and connected to the guide pin (23) to secure the guide pin to the vanes for pivotable limited excursion of the vanes to prevent binding of the guide pin in curved portions of the spinal column of a carcass when a guide pin is inserted in the spinal opening of the carcass, and upon movement of the carrier lengthwise relative to the spinal column.

2. Apparatus according to claim 1 further comprising movement limit means limiting pivoting of the guide pin (23) about an angle of about 15° maximum.

3. Apparatus according to claim 2 wherein the angle is approximately 10° maximum.

4. Apparatus according to claim 2 wherein one limit position of the pivoting movement maintains the pin in approximately vertical direction.

5. Apparatus according to claim 1 wherein the pivot means comprises a pair of headed pivot elements, each pivot element extending through a respective guide vane into the guide pin (23) from either side to form a pivot point for the guide pin;
    and limit stop means engaging the vanes and the pin to form a limit stop for limited pivoting movement of said guide pin (23).

6. Apparatus according to claim 5 wherein the guide pin (23) is formed with a longitudinal central slot (24) extending from the portion thereof pivotably attached to the vanes, to separate the guide pin into two pin half-portions,
    and wherein each pivot element of the pair extends through the respective vane clear of the interior of the respective half-portion to provide a clear slot for entry of the cutting means (16) between the vanes and past the pivot elements into the slot of the pin.

7. Apparatus according to claim 6 wherein the stop means comprise a pair of stop elements, each stop element extending from the vane clear of the slot towards the interior of the respective half-portion of the pin.

* * * * *

UNITED STATES PATENT AND TRADEMARK OFFICE
CERTIFICATE OF CORRECTION

PATENT NO. : 4,109,347
DATED : August 29, 1978
INVENTOR(S) : Andre JOLIN

It is certified that error appears in the above-identified patent and that said Letters Patent are hereby corrected as shown below:

Item [30], "Foreign Application Priority Data" should read:

--Jan. 8, 1976 [CH] Switzerland......140/76--.

Signed and Sealed this

Twentieth Day of March 1979

[SEAL]

Attest:

RUTH C. MASON
Attesting Officer

DONALD W. BANNER
Commissioner of Patents and Trademarks